US010663332B2

(12) United States Patent
Liu

(10) Patent No.: US 10,663,332 B2
(45) Date of Patent: May 26, 2020

(54) STRUCTURE OF FLOW MEASUREMENT SENSOR BASED ON TIME-OF-FLIGHT AND METHOD FOR INSTALLATION THEREOF

(71) Applicant: Guangzhou PhoTime Instrument CO.,LTD., Guangdong (CN)

(72) Inventor: Fenghua Liu, Guangdong (CN)

(73) Assignee: GUANGZHOU PHOTIME INSTRUMENT CO., LTD., Guangdong (CN)

( * ) Notice: Subject to any disclaimer, the term of this patent is extended or adjusted under 35 U.S.C. 154(b) by 0 days.

(21) Appl. No.: 16/098,331

(22) PCT Filed: Aug. 30, 2017

(86) PCT No.: PCT/CN2017/099612
§ 371 (c)(1),
(2) Date: Nov. 1, 2018

(87) PCT Pub. No.: WO2019/041159
PCT Pub. Date: Mar. 7, 2019

(65) Prior Publication Data
US 2019/0293464 A1    Sep. 26, 2019

(51) Int. Cl.
*G01F 1/66* (2006.01)
(52) U.S. Cl.
CPC ............... *G01F 1/662* (2013.01); *G01F 1/66* (2013.01); *G01F 1/661* (2013.01)
(58) Field of Classification Search
CPC ........................................................ G01F 1/66
See application file for complete search history.

(56) References Cited

U.S. PATENT DOCUMENTS 4,831,884 A * 5/1989 Drenthen ................ G01F 1/662
   73/861.27
7,571,656 B2  8/2009 Derevyagin et al.
(Continued)

FOREIGN PATENT DOCUMENTS

BR    PI1104088-2 A2    12/2012
CN        2869794 Y     2/2007
(Continued)

OTHER PUBLICATIONS

Supplementary European Search Report for Serial No. 05722168 dated May 31, 2007.
(Continued)

*Primary Examiner* — Jewel V Dowtin
(74) *Attorney, Agent, or Firm* — McCormick, Paulding & Huber PLLC

(57) ABSTRACT

Disclosed are a structure of a flow measurement sensor based on time-of-flight and a method for installation thereof, the structure comprises at least one pair of a first flow measurement sensor and a second flow measurement sensor vertically installed on a pipeline wall, a beam transmit-receive end both provided respectively at a bottom of the first flow measurement sensor and the second flow measurement sensor and is capable of emitting and receiving beams, a beam straight line formed between a first beam transmit-receive end and a second beam transmit-receive end does not intersect with an axis of the pipeline, and forms, with the axis of the pipeline, an included angle less than 90°.

19 Claims, 8 Drawing Sheets

(56) References Cited

U.S. PATENT DOCUMENTS

| | | | |
|---|---|---|---|
| 7,706,986 | B2 | 4/2010 | Fröhlich et al. |
| 7,954,387 | B1 | 6/2011 | Furlong |
| 2006/0278016 | A1 | 12/2006 | Froehlich et al. |
| 2009/0151471 | A1 | 6/2009 | Derevyagin et al. |
| 2015/0020608 | A1* | 1/2015 | Chevrier ............... G01F 1/667 73/861.31 |
| 2017/0167904 | A1* | 6/2017 | Sathyanarayana ...... G01F 1/662 |
| 2017/0241818 | A1* | 8/2017 | Jacobson ............... G01F 1/667 |

FOREIGN PATENT DOCUMENTS

| | | |
|---|---|---|
| CN | 1926409 A | 3/2007 |
| CN | 100387942 C | 5/2008 |
| CN | 102426037 A | 4/2012 |
| CN | 102426037 B | 6/2013 |
| DE | 4232526 A1 | 3/1994 |
| DE | 102005022048 A1 | 11/2006 |
| DE | 102008055031 A1 | 9/2010 |
| DE | 102011052670 A1 | 2/2012 |
| DE | 102011052670 B4 | 3/2013 |
| DK | 1722221 T3 | 10/2017 |
| EA | 200500319 A1 | 10/2005 |
| EA | 006792 B1 | 4/2006 |
| EP | 0268314 A1 | 5/1988 |
| EP | 0268314 B1 | 5/1988 |
| EP | 0639776 A1 | 2/1995 |
| EP | 1722221 A2 | 11/2006 |
| EP | 1736741 A1 | 12/2006 |
| EP | 1736741 B1 | 7/2012 |
| EP | 1722221 A3 | 1/2014 |
| EP | 1722221 B1 | 8/2017 |
| ES | 2022310 B3 | 12/1991 |
| GB | 2482968 A | 2/2012 |
| GB | 2482968 B | 10/2017 |
| NL | 8602690 A | 5/1988 |
| NO | 20111108 A1 | 2/2012 |
| RU | 2004110782 A | 10/2005 |
| RU | 2264602 C1 | 11/2005 |
| WO | 2005098374 A1 | 10/2005 |
| WO | 0244662 A1 | 6/2012 |

OTHER PUBLICATIONS

International Search Report for Serial No. PCT/CN2017/099612 dated Jun. 5, 2018.

* cited by examiner

STRUCTURE OF FLOW MEASUREMENT SENSOR BASED ON TIME-OF-FLIGHT AND METHOD FOR INSTALLATION THEREOF

CROSS-REFERENCE TO RELATED APPLICATION

This application is a National Stage application of International Patent Application No. PCT/CN2017/099612, filed on Aug. 30, 2017, which is hereby incorporated by reference in its entirety.

TECHNICAL FIELD

The disclosure relates to the field of flow measurement, in particular to a structure of a flow measurement sensor based on time-of-flight and method for installation thereof.

BACKGROUND

Time-of-flight method measurement refers to the use of a pair of beam transducers to alternately (or simultaneously) emit and receive beams toward each other, the flow rate of measured fluid is calculated by detecting the time difference between forward and reverse flow propagation of the beams in a medium, and then flow quantity is calculated by the flow rate. The beams which can be applied to flow measurement include acoustic waves, ultrasonic waves and light waves.

Beam flowmeter has been applied in more and more occasions because it has no moving parts and is long in service life, high in accuracy and good in stability. For example, two-channel and multi-channel ultrasonic flowmeters have been gradually applied to fields with high accuracy requirements such as petrochemical industry. By the use of an on-site plug-in sensor, a large-caliber beam flowmeter can be equipped with a flow measuring device on an existing pipeline, thus greatly reducing the cost of pipe section processing, transportation, on-site installation and fluid transportation interruption of the large-caliber flowmeter.

Two-channel or multi-channel beam measurement can greatly improve the stability and accuracy of flow measurement. This is mainly because during single-channel measurement, there is only one beam path which passes through the center of a pipeline. From theoretical analysis and practical verification, it has been confirmed that the flow measurement coefficient of the measurement method, namely the ratio of a time difference measurement result to actual flow is greatly influenced by Reynolds number. The Reynolds number of the fluid is related to the flow rate and viscosity of the fluid and the caliber of the pipeline. Even if a plurality of channels passing through the center of the pipeline are used, the influence of flow rate distribution on the flow measurement coefficient cannot be solved. Therefore, the stability and accuracy of single-channel flow measurement or multi-channel measurement with all channels passing through the center of the pipeline cannot meet the requirements of most industrial applications.

Taking an ultrasonic flowmeter as an example, at present, most plug-in beam flowmeter sensors can only measure the sound channel passing through the axis of a pipeline. The plug-in beam sensor is presented with a certain angle between the emission direction and the installation axis thereof. Although the installation process of the sensor is simple, the measurement coefficient is greatly influenced by the flow rate and viscosity of fluid as well as turning, valves and other disturbances. By using two or more channels which do not pass through the center of the pipeline, the calculation problem of the flow coefficient can be solved, so that the flowmeter can have stable measurement accuracy under various working conditions. In particular, in the case of a path design where the chord-center has a distance to pipe center ½ of the pipe internal radius (hereinafter referred to as the "half radius chord path"), the flow coefficient is close to 1.00 in a wide range of Reynolds numbers. As shown in FIG. 5, comparing the relationship between the flow measurement coefficients of two beam paths and the Reynolds number, it can be seen that the flow coefficient of the half radius chord path is very stable under a large range of fluid conditions, which is very advantageous to the stability of flow measurement accuracy.

However, in practical applications, a beam path which does not pass through the center of a pipeline is generally only suitable for the production of pipe section type flowmeters of medium and small caliber, and installation and adjustment are conducted in the factory. It is very difficult to accurately locate and directionally install a sensor on a pipeline under the condition that a large-caliber flowmeter is produced or a hot tapping insertion flowmeter needs to be installed on site. For example, the German company Siemens has introduced a two-channel hot tapping insertion sensor for on-site installation, realizing a half chord-center distance beam path which can achieve a high measurement accuracy in a large flow range. However, the on-site installation process of the two-channel plug-in sensor is very complicated, as shown in FIG. 3 and FIG. 4, a special bevel sleeve needs to be welded on the surface of an on-site pipeline to install the sensor. The bevel sleeve has different models according to the size of the pipeline, and special tools are needed on site for bevel welding and drilling. This requires high operation precision, increases the installation difficulty and results in high installation cost, thus greatly limits its application. Besides, since the sensor is installed at an inclined angle, it is difficult to replace the sensor online without stopping the flow in the case of sensor damage during use.

SUMMARY

In order to solve the above technical problems, an objective of the disclosure is to provide a structure of a flow measurement sensor based on time-of-flight with low installation complexity, low installation cost and high flow measurement accuracy.

Another objective of the disclosure is to provide a method for installing a flow measurement sensor based on time-of-flight with convenient installation to achieve a stable flow coefficient within a range of Reynolds numbers for fluids and high flow measurement accuracy.

The first technical solution adopted by the disclosure is as follows.

There is provided a structure of a flow measurement sensor based on time-of-flight comprising:

a first flow measurement sensor vertically installed on a pipeline wall, a beam transmit-receive end both provided at a bottom of the first flow measurement sensor and is capable of emitting and receiving beams, and the second flow measurement sensor being provided at a bottom with a second beam end capable of emitting and receiving beams, a second flow measurement sensor vertically installed on the pipeline wall which appears in pair with the first flow measurement sensor, a beam transmit-receive end both provided at a bottom of the second flow measurement sensor and is capable of emitting and receiving beams, wherein a beam straight line is formed between the first beam transmit-receive end and the second beam transmit-receive end, which does not intersect with an axis of the pipeline and forms, with the axis of the pipeline, an included angle less than 90°.

Further, an installation axis of the first flow measurement sensor coincides with a structural center line of the first flow measurement sensor and intersects with the axis of the pipeline, an installation axis of the second flow measurement sensor coincides with a structural center line of the second flow measurement sensor and intersects with the axis of the pipeline, a first flow direction indicator is provided at a top of the first flow measurement sensor, a second flow direction indicator is provided at a top of the second flow measurement sensor, wherein indicating directions of the first flow direction indicator and the second flow direction indicator are both adjustable to be parallel to the axis of the pipeline.

Further, the installation axis of the first flow measurement sensor and the installation axis of the second flow measurement sensor each forms, with the beam straight line, a first included angle ranging from 30° to 70°.

Further, the installation axis of the first flow measurement sensor and the installation axis of the second flow measurement sensor each forms, with a projection of the beam straight line on the cross section of the pipeline, a second included angle ranging from 25° to 35°.

Further, the beam straight line and the installation axis of the first flow measurement sensor form a first plane, and a third included angle is formed between the indicating direction of the first flow direction indicator and the first plane, wherein the expression of the third included angle γ is $$\gamma = \arcsin\left(\frac{\tan(\beta)}{\tan(\alpha)}\right),$$

wherein α represents the first included angle and β represents the second included angle.

Further, the first flow measurement sensor and the second flow measurement sensor are same or are mirror with respect to each other.

Further, the beams are acoustic waves, ultrasonic waves, electromagnetic waves or light waves.

The second technical solution adopted by the disclosure is as follows.

There is provided a method for installing a flow measurement sensor based on time-of-flight, comprising the following steps:

vertically installing a first and a second flow measurement sensors of a flow measurement sensor pair on a pipeline wall in such a way that a beam straight line does not intersect with an axis of the pipeline and forms, with the axis of the pipeline, an included angle less than 90°;

wherein the step of vertically installing the second flow measurement sensor on the pipeline wall comprises the following steps:

calculating, according to a set second included angle, a fourth included angle on the cross section of the pipeline which is formed by an installation axis of the second flow measurement sensor and the first flow measurement sensor, wherein a formula for calculating the fourth included angle θ is θ=180°−2*β, wherein the second included angle β is an included angle between an installation axis of the first flow measurement sensor or the installation axis of the second flow measurement sensor and a projection of the beam straight line on the cross section of the pipeline;

calculating an offset distance of an installation point of the second flow measurement sensor from the first flow measurement sensor along the axis of the pipeline, wherein a formula for calculating the offset distance L is L=ID*cos(β)*sin(β)/tan(γ), wherein the third included angle γ is an included angle between an indicating direction of a first flow direction indicator and a first plane formed by the beam straight line and the installation axis of the first flow measurement sensor, and ID represents a diameter of the pipeline; and vertically installing the second flow measurement sensor on the pipeline wall according to the calculated fourth included angle and the offset distance.

Further, the step of vertically installing the second flow measurement sensor on the pipeline wall according to the calculated fourth included angle and the offset distance comprises the following steps:

determining whether beams between the first flow measurement sensor and the second flow measurement sensor are reflected by the pipeline wall or not, if so, then process to the next step; otherwise, vertically installing the second flow measurement sensor on the pipeline wall directly according to the calculated fourth included angle and the offset distance;

calculating an included angle θ' between an installation position of the first flow measurement sensor and an installation position of the second flow measurement sensor on the cross section of the pipeline, wherein a formula for calculating the included angle θ' is θ'=θ*(N+1), wherein θ is the fourth included angle, and N is the number of reflections of the beams on the inner wall of the pipeline;

calculating an installation spacing according to the offset distance, wherein a formula for calculating the installation spacing L' is L'=L*(N+1), wherein L is the offset distance, and N is the number of reflections of the beams on an inner wall of the pipeline; and vertically installing the second flow measurement sensor on the pipeline wall according to the calculated included angle θ' and the installation spacing.

Further, the installation method also comprises the step of adjusting indicating directions of the first flow direction indicator and the second flow direction indicator to be parallel to the axis of the pipeline.

The structure of the flow measurement sensor based on time-of-flight of the disclosure, by taking advantage of the flow measurement sensor being vertically installed on the pipeline wall, is advantageous in reducing the installation complexity and the installation cost of the flow measurement sensor and improving installation precision of the flow measurement sensor. Furthermore, the flow measurement sensor of the disclosure can be replaced online more easily, and thus greatly reducing the utilization and maintenance cost.

The installation method of the disclosure is advantageous in that the installation position of the flow sensor can be quickly calculated with a fixed fourth included angle and an offset distance obtained by inputting a pipeline diameter into a formula for calculation of the offset distance, operators do not need much professional knowledge or to use complicated installation tools to adjust the angle, the beam path can be prevented from passing through the circle center of the pipeline simply by conducting installation according to the operation steps, in particular, the beam path can be conveniently adjusted to pass through a half chord-center distance path and paths with multiple reflections; and thus the influence of the Reynolds number of the fluid on the measurement coefficient is reduced, large-flow measurement accuracy is greatly improved, and the scope pf application is greatly widened, which makes it possible for multiple application scenarios.

Figure 1:
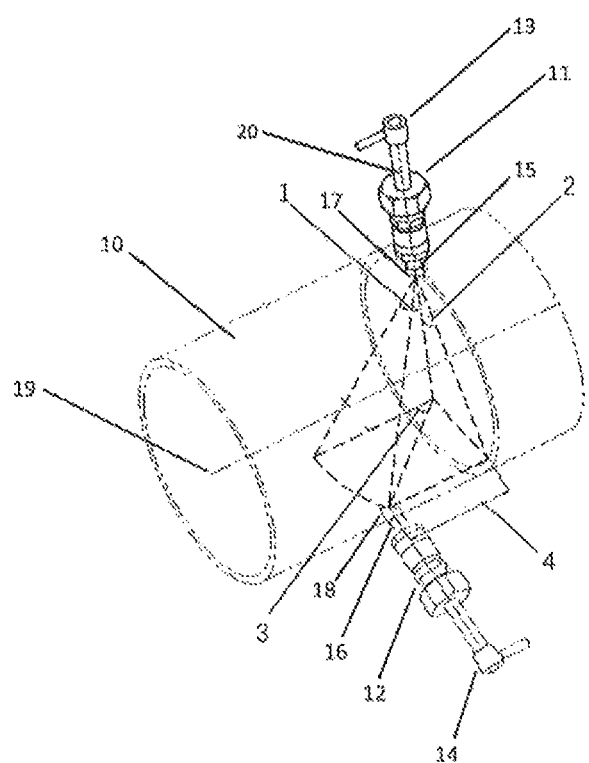
FIG. 1 is a stereogram for angle calculation in a method for installing a flow measurement sensor based on time-of-flight according to the disclosure.

Reference numerals: 1. first included angle; 2. second included angle; 3. third included angle; 4. offset distance; 5. pipeline diameter; 6. direction indicator; 7. structural center line of flow measurement sensor; 8. installation included angle θ of a pair of sensors; 9. chord-center distance of projection of a sensor beam on cross section of the pipeline; 10. pipeline wall; 11. the first measurement sensor; 12. the second measurement sensor; 13. a top of the first measurement sensor; 14. a top of the second measurement sensor; 15. a bottom of the first measurement sensor; 16. a bottom of the second measurement sensor; 17. first beam transmit-receive end; 18. second beam transmit-receive end; 19. axis of the pipeline; 20. installation axis.

DETAILED DESCRIPTION

Referring to FIG. 1, a structure of a flow measurement sensor based on time-of-flight comprises a pair of first flow measurement sensor and a second flow measurement sensor which are both vertically installed on the wall of a pipeline, a beam transmit-receive end both provided at a bottom of the first flow measurement sensor and is capable of emitting and receiving beams, a beam transmit-receive end both provided at a bottom of the second flow measurement sensor and is capable of emitting and receiving beams, a beam straight line is formed between the first beam transmit-receive end and the second beam transmit-receive end, the beam straight line does not intersect with the axis of the pipeline, while the included angle between the beam straight line and the axis of the pipeline is less than 90°.

Figure 4:
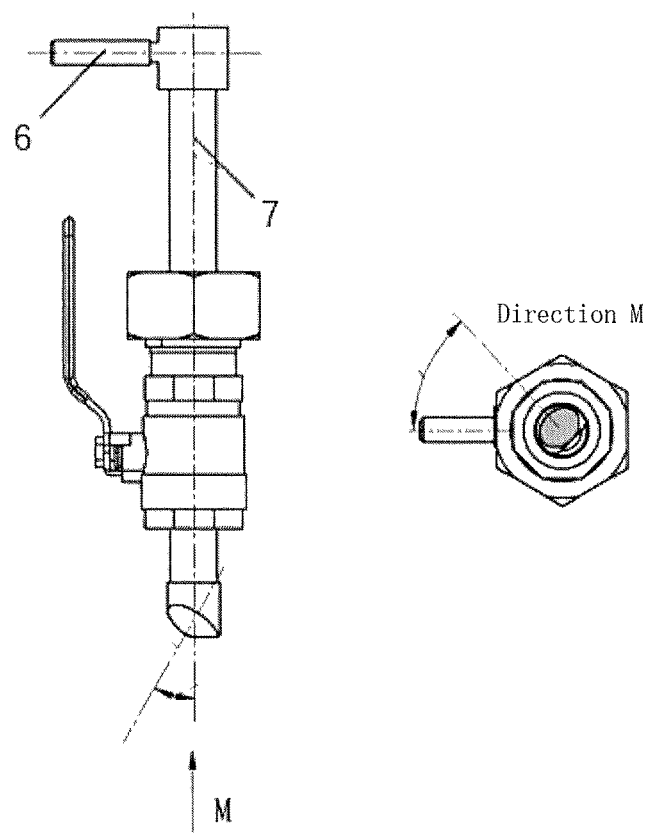
FIG. 4 is a schematic diagram of the structure of the flow measurement sensor based on time-of-flight according to the disclosure.

Referring to FIG. 4, further as a preferred embodiment, an installation axis of the first flow measurement sensor coincides with a structural center line 7 of the first flow measurement sensor and intersects with the axis of the pipeline, an installation axis of the second flow measurement sensor coincides with a structural center line 7 of the second flow measurement sensor and intersects with the axis of the pipeline, a first flow direction indicator is provided at a top of the first flow measurement sensor, a second flow direction indicator is provided at a top of the second flow measurement sensor, wherein indicating directions of the first flow direction indicator and the second flow direction indicator are both adjustable to be parallel with the axis of the pipeline.

The flow measurement sensor structure comprises three characteristic lines: the installation axis of the sensor, the beam straight line of the sensor, and the flow direction indicator line of the sensor.

The flow direction indicator 6 is used to adjust the direction in which the flow measurement sensor receives or emits a beam, particularly, the installed flow measurement sensor rotates with the structural center line as the axis, so as to adjust the indicating direction of the flow direction indicator 6. When a pair of flow direction indicators are adjusted by their directions to be consistent with the axis of the pipeline at the same time, it can be achieved that the beam straight line does not intersect with the axis of the pipeline and that the included angle between the beam straight line and the axis of the pipeline is less than 90°.

Referring to FIG. 1, as a further preferred embodiment, the installation axis of the first flow measurement sensor and the installation axis of the second flow measurement sensor each forms, with the beam straight line, a first included angle 1 ranging from 30° to 70°.

Referring to FIG. 1, as a further preferred embodiment, the installation axis of the first flow measurement sensor and the installation axis of the second flow measurement sensor each forms, with the projection of the beam straight line on the cross section of the pipeline, a second included angle 2 ranging from 25° to 35°.

Referring to FIG. 1, as a further preferred embodiment, the beam straight line and the installation axis of the first flow measurement sensor form a first plane, a third included angle 3 is formed between the indicating direction of the first flow direction indicator and the first plane, wherein the expression of the third included angle γ is $$\gamma = \arcsin\left(\frac{\tan(\beta)}{\tan(\alpha)}\right),$$

wherein α represents the first included angle 1 and β represents the second included angle 2.

As a further preferred embodiment, the first flow measurement sensor and the second flow measurement sensor are same or are mirror with respect to each other inversion symmetry.

As a further preferred embodiment, the beams are acoustic waves, ultrasonic waves, electromagnetic waves or light waves.

Corresponding to the structure of FIG. 1, a method for installing a flow measurement sensor based on time-of-flight comprises the following steps:

vertically installing a first and second flow measurement sensors of a flow measurement sensor pair on a pipeline wall in such a way that a beam straight line does not intersect with an axis of the pipeline and that an included angle between the beam straight line and the axis of the pipeline is less than 90°;

wherein the step of vertically installing the second flow measurement sensor on the pipeline wall comprises the following steps:

according to a predetermined second included angle 2, calculating a fourth included angle on the cross section of the pipeline, formed by the installation axis of the second flow measurement sensor and the first flow measurement sensor, wherein the formula for calculating the fourth included angle θ is θ=180°−2*β, wherein the second included angle β is an included angle between the installation axis of the first flow measurement sensor or the installation axis of the second flow measurement sensor and the projection of the beam straight line on the cross section of the pipeline;

calculating an offset distance 4 between an installation point of the second flow measurement sensor and the first flow measurement sensor along the axis of the pipeline, wherein the formula for calculating the offset distance L is L=ID*cos(β)*sin(β)/tan(γ), wherein the third included angle γ is an included angle between the indicating direction of a first flow direction indicator and the first plane, the first plane is formed by the beam straight line and the installation axis of the first flow measurement sensor, and ID represents the diameter of the pipeline 5; and vertically installing the second flow measurement sensor on the pipeline wall according to the calculated fourth included angle and offset distance 4;

wherein a first flow direction indicator is provided at a top of the first flow measurement sensor.

As a further preferred embodiment, the step of vertically installing the second flow measurement sensor on the pipeline wall according to the calculated fourth included angle and the offset distance 4 comprises the following steps:

determining whether the beams between the first flow measurement sensor and the second flow measurement sensor are reflected by the pipeline wall or not, if so, then process to the next step; otherwise, vertically installing the second flow measurement sensor on the pipeline wall directly according to the calculated fourth included angle and the offset distance 4;

calculating the included angle θ' between an installation position of the first flow measurement sensor and an installation position of the second flow measurement sensor on the cross section of the pipeline, wherein the formula for calculating the included angle θ' is θ'=θ*(N+1), wherein θ is the fourth included angle, and N is the number of reflections of the beams on the inner wall of the pipeline;

calculating an installation spacing according to the offset distance 4, wherein the formula for calculating the installation spacing L' is L'=L*(N+1), wherein L is the offset distance 4, and N is the number of reflection of the beams on the inner wall of the pipeline; and vertically installing the second flow measurement sensor on the pipeline wall according to the calculated included angle θ' and installation spacing.

As a further preferred embodiment, the method also comprises the step of adjusting the indicating directions of the first flow direction indicator and the second flow direction indicator to be parallel to the axis of the pipeline.

Figure 7:
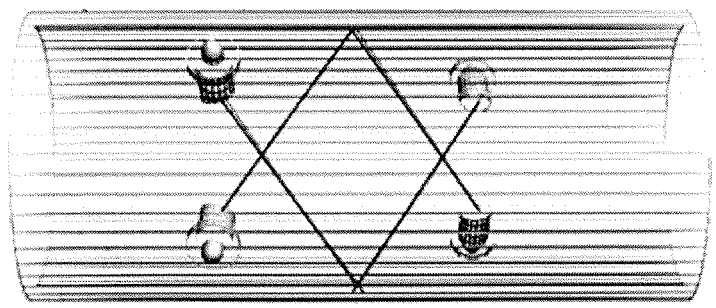
FIG. 7 is a side view of the flow measurement sensor with beams having one reflection by the inner wall of a pipeline.
Figure 8:
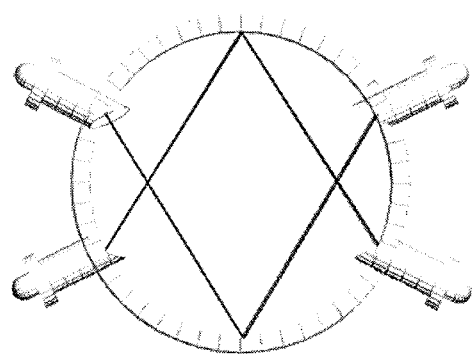
FIG. 8 is a sectional view of the flow measurement sensor with beams having one reflection by the inner wall of the pipeline.

Referring to FIG. 7 and FIG. 8, beam reception and emission can be realized between the flow measurement sensors of the disclosure by one beam reflection on the inner wall of the pipeline.

Figure 9:
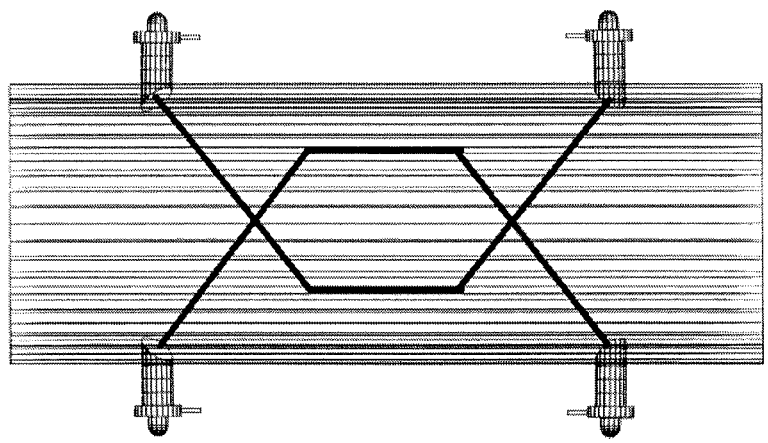
FIG. 9 is a side view of the flow measurement sensor with beams having two reflection by the inner wall of the pipeline.
Figure 10:
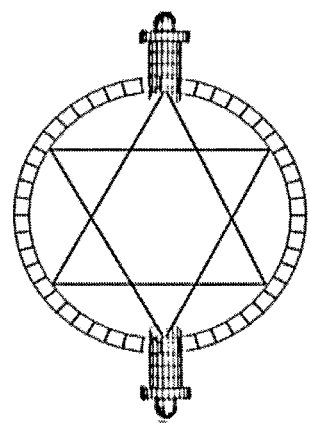
FIG. 10 is a sectional view of the flow measurement sensor with beams having two reflection by the inner wall of the pipeline.

Referring to FIG. 9 and FIG. 10, beam reception and emission can be realized between the flow measurement sensors of the disclosure by two beam reflections on the inner wall of the pipeline.

The structure of the flow measurement sensor of the disclosure can further be applied to liquid and gas flow measurement.

The disclosure will be further explained with reference to the drawings and the specific example.

Figure 2:
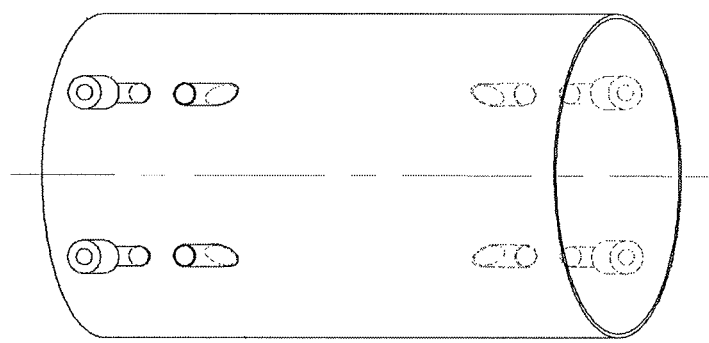
FIG. 2 is a front view of the installation structure of an existing flow measurement sensor.
Figure 3:
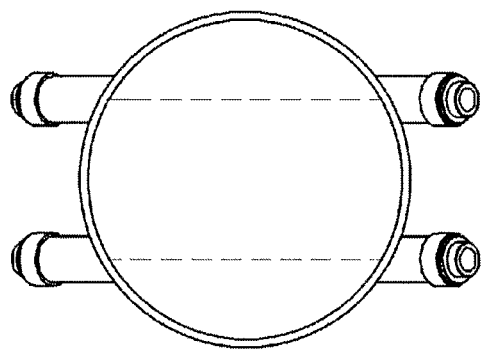
FIG. 3 is a diagram of a parallel channel installation structure of an existing flow measurement sensor.

The on-site installation process of an existing two-channel plug-in sensor produced by Siemens is very complicated, as shown in FIG. 2 and FIG. 3, which requires welding a special bevel sleeve onto the surface of a pipeline on the scene so as to install the sensor, and thus the requirement of operation precision is very high and the equipment cost is high. According to the disclosure, welding of a special bevel sleeve onto the surface of a pipeline on the scene is not required, and the flow measurement sensor can be vertically installed on the pipeline wall simply by punching holes through the pipeline wall, which greatly reduces the installation complexity and the installation cost of the flow measurement sensor.

A structure of a flow measurement sensor and a method for installation thereof according to the disclosure are described in detail below by taking a flow measurement sensor based on time-of-flight with a second included angle 2 being 30° and the transmission beams being sound waves as an example.

Referring to FIG. 1, a structure of a flow measurement sensor based on time-of-flight comprises a first flow measurement sensor and a second flow measurement sensor which are both vertically installed on a pipeline wall. A first flow direction indicator and a second flow direction indicator are respectively provided at a top of the first flow measurement sensor and the second flow measurement sensor. The first included angle 1 is set to be 30° by adjusting the first flow direction indicator, while the indicating directions of the first flow direction indicator and the second flow direction indicator are adjusted to be aligned with the axis of the pipeline, so that the beam straight line does not intersect with the axis of the pipeline and that the included angle between the beam straight line and the axis of the pipeline is less than 90°.

Figure 6:
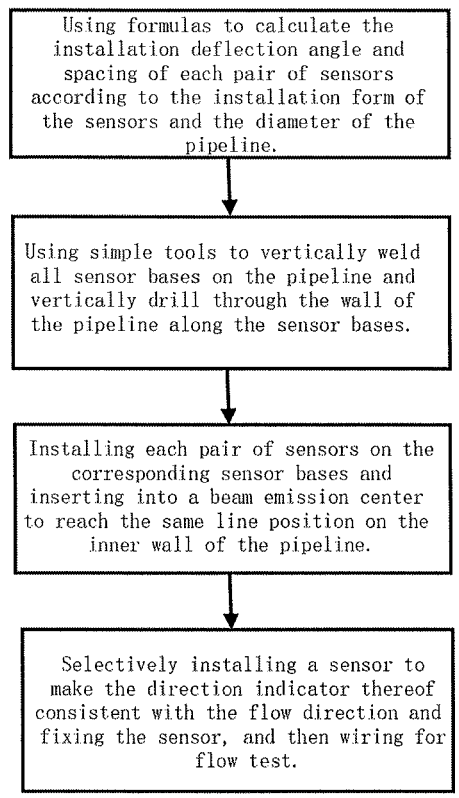
FIG. 6 is a flowchart of operation steps of an embodiment of the method for installing the flow measurement sensor based on time-of-flight according to the disclosure.
Figure 11:
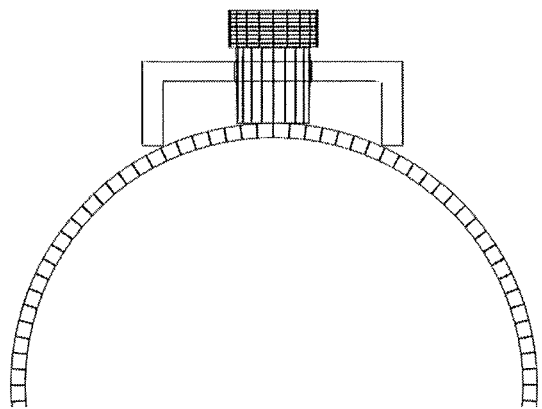
FIG. 11 is a schematic diagram showing vertical installation of a flow measurement sensor on the wall of a pipeline according to embodiment 1.
Figure 12:
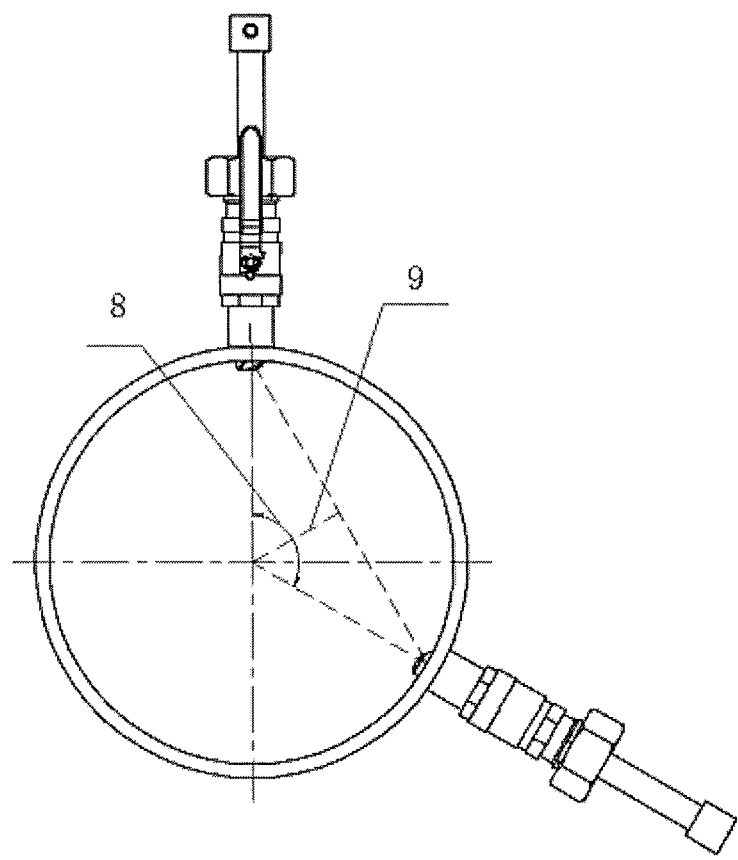
FIG. 12 is a stereogram for angle calculation in a method for installing a flow measurement sensor according to embodiment 1.

Referring to FIG. 1, FIG. 6 and FIG. 12, a method for installing a flow measurement sensor with the above structure comprises the following steps:

S1, vertically installing a first flow measurement sensor on a pipeline wall as shown in FIG. 11;

S2, adjusting a first flow direction indicator so that a second included angle 2 reaches an optimally designed angle of 30° and a first included angle 1 reaches a predetermined angle;

S3, calculating a third included angle 3 according to the first included angle 1 and second included angle 2, wherein the formula for calculating the third included angle 3 is $$\gamma = \arcsin\left(\frac{\tan(\beta)}{\tan(\alpha)}\right),$$

wherein γ represents the third included angle 3, α represents the first included angle 1, and β represents the second included angle 2;

S4, according to the set second included angle 2, calculating a fourth included angle formed on the cross section of the pipeline by an installation axis of a second flow measurement sensor and the first flow measurement sensor, wherein the formula for calculating the fourth included angle is θ=180°−2*θ, wherein θ is the fourth included angle, and β is the second included angle 2;

S5, according to the set first included angle 1, the set second included angle 2 and the calculated third included angle 3, calculating an offset distance of an installation point of the second flow measurement sensor from the first flow measurement sensor along the axis of the pipeline;

wherein the calculation process of the offset distance is as follows:

according to the set first included angle 1, the set second included angle 2 and the calculated third included angle 3, calculating the offset distance 4 of the installation point of the second flow measurement sensor from the first flow measurement sensor along the axis of the pipeline, wherein the formula for calculating the offset distance 4 is L=ID*cos(β)*sin(β)/tan(γ), wherein L represents the offset distance 4, and ID represents the diameter of the pipeline 5;

S6, determining whether the beams between the first flow measurement sensor and the second flow measurement sensor are reflected by the pipeline wall or not, if so, then process to the next step; otherwise, vertically installing the second flow measurement sensor on the pipeline wall directly according to the calculated fourth included angle and offset distance;

calculating the included angle θ' between the installation position of the first flow measurement sensor and the installation position of the second flow measurement sensor on the cross section of the pipeline, wherein the formula for calculating the included angle θ' is θ'=θ*(N+1), wherein θ is the fourth included angle, and N is the number of reflections of the beams on the inner wall of the pipeline;

calculating an installation spacing according to the offset distance, wherein the formula of the installation spacing is L'=L*(N+1), L' is the installation spacing, wherein L is the offset distance 4, and N is the number of reflections of the beams on the inner wall of the pipeline; and vertically installing the second flow measurement sensor on the pipeline wall according to the calculated included angle θ' and installation spacing;

S7, adjusting the indicating directions of the first flow direction indicator and the second flow direction indicator to be parallel to the axis of the pipeline.

Figure 5:
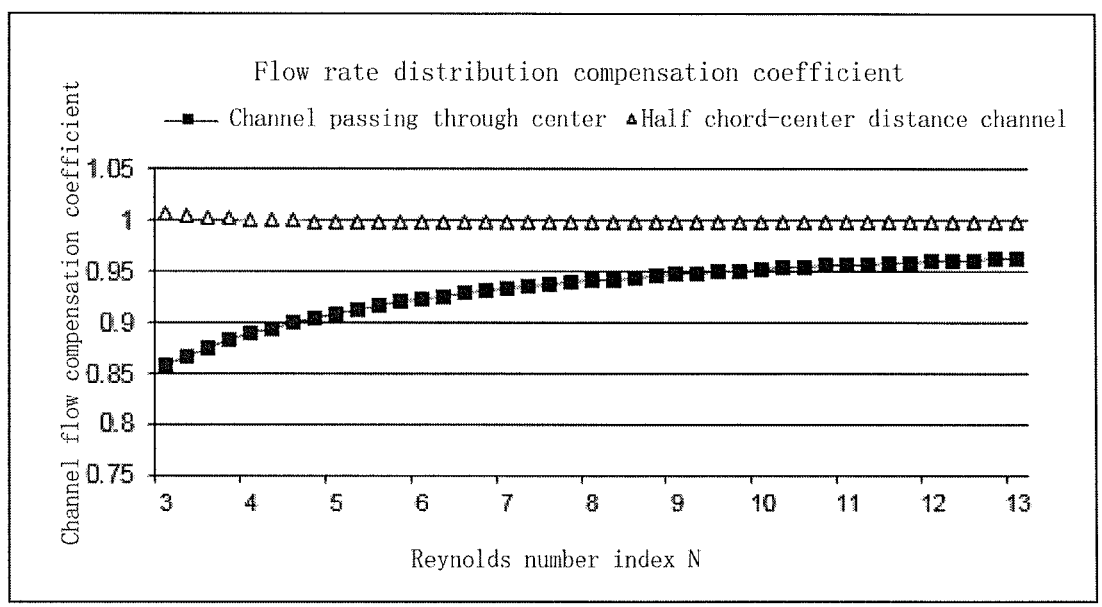
FIG. 5 is a graph showing comparison of flow measurement compensation coefficient measured by a beam passing through the center with that measured by a half chord-center distance beam.

Referring to FIG. 5, taking a flow measurement sensor with transmission beams being acoustic waves as an example, when the beam straight line passes through the center of the cross section of the pipeline, the flow compensation coefficient is greatly affected by the changing Reynolds number and thus the result is unstable; and when the beam straight line is set to be half chord height, the flow compensation coefficient is barely affected by the changing Reynolds coefficient and thus the result is stable and reliable. Therefore, the shortest distance between the beam straight line and the axis of the pipeline is set to be half of the radius of the pipeline (namely half chord-center distance beams) in the example, which can greatly improve the accuracy of large-flow measurement and reduce the influence of the Reynolds number of the fluid on the measurement coefficient.

The directions in the above-described embodiment and the drawings are marked as directional rods, which can also be in various forms such as etching arrows, grooving and the like, so as to achieve the purpose of indicating and adjusting the rotational positioning around the axis during sensor installation, and all of these conform to the essence of the present disclosure and are included within the scope defined in the claims of the present application.

In the above-described embodiment, drawings and calculation formulas, the center point of the sensor for transmission or reception falls on the axis of the sensor, and the position of the center point may be offset to some extent in practical application. Such offset can be reflected in the calculation formulas, still conforms to the essence of the disclosure, and is included within the scope defined in the claims of the present application.

The above is a detailed description of the preferred embodiments of the present disclosure, but the present disclosure is not limited to the described embodiments. Those skilled in the art can make various equivalent modifications or substitutions without departing from the principle of the present disclosure, and these equivalent modifications or substitutions are all included within the scope defined in the claims of the present application.

The invention claimed is:

1. A structure of a flow measurement sensor based on time-of-flight, comprising:

at least one pair of a first flow measurement sensor and a second flow measurement sensor vertically installed on a pipeline wall, wherein a first beam transmit-receive end is provided at a bottom of the first flow measurement sensor and is capable of emitting and receiving beams, and a second beam transmit-receive end is provided at a bottom of the second flow measurement sensor and is capable of emitting and receiving beams, wherein a beam straight line is formed between the first beam transmit-receive end and the second beam transmit-receive end, which does not intersect with an axis of the pipeline and forms, with the axis of the pipeline, an included angle less than 90°.

2. The structure of a flow measurement sensor based on time-of-flight according to claim 1, wherein an installation axis of the first flow measurement sensor coincides with a structural center line of the first flow measurement sensor and intersects with the axis of the pipeline, an installation axis of the second flow measurement sensor coincides with a structural center line of the second flow measurement sensor and intersects with the axis of the pipeline, a first flow direction indicator is provided at a top of the first flow measurement sensor, a second flow direction indicator is provided at a top of the second flow measurement sensor, wherein indicating directions of the first flow direction indicator and the second flow direction indicator are both adjustable to be parallel to the axis of the pipeline.

3. The structure of a flow measurement sensor based on time-of-flight according to claim 2, wherein the installation axis of the first flow measurement sensor and the installation axis of the second flow measurement sensor each forms, with the beam straight line, a first included angle ranging from 30° to 70°.

4. The structure of a flow measurement sensor based on time-of-flight according to claim 3, wherein the installation axis of the first flow measurement sensor and the installation axis of the second flow measurement sensor each forms, with a projection of the beam straight line on the cross section of the pipeline, a second included angle ranging from 25° to 35°.

5. The structure of a flow measurement sensor based on time-of-flight according to claim 4, wherein the beam straight line and the installation axis of the first flow measurement sensor form a first plane, and a third included angle is formed between the indicating direction of the first flow direction indicator and the first plane, wherein the expression of the third included angle γ is $$\gamma = \arcsin\left(\frac{\tan(\beta)}{\tan(\alpha)}\right),$$

wherein α represents the first included angle and β represents the second included angle.

6. The structure of a flow measurement sensor based on time-of-flight according to claim 1, wherein the first flow measurement sensor and the second flow measurement sensor are same or are mirror with respect to each other.

7. The structure of a flow measurement sensor based on time-of-flight according to claim 2, wherein the first flow measurement sensor and the second flow measurement sensor are same or are mirror with respect to each other.

8. The structure of a flow measurement sensor based on time-of-flight according to claim 3, wherein the first flow measurement sensor and the second flow measurement sensor are same or are mirror with respect to each other.

9. The structure of a flow measurement sensor based on time-of-flight according to claim 4, wherein the first flow measurement sensor and the second flow measurement sensor are same or are mirror with respect to each other.

10. The structure of a flow measurement sensor based on time-of-flight according to claim 5, wherein the first flow measurement sensor and the second flow measurement sensor are same or are mirror with respect to each other.

11. The structure of a flow measurement sensor based on time-of-flight according to claim 1, wherein the beams are acoustic waves, ultrasonic waves, electromagnetic waves or light waves.

12. The structure of a flow measurement sensor based on time-of-flight according to claim 2, wherein the beams are acoustic waves, ultrasonic waves, electromagnetic waves or light waves.

13. The structure of a flow measurement sensor based on time-of-flight according to claim 3, wherein the beams are acoustic waves, ultrasonic waves, electromagnetic waves or light waves.

14. The structure of a flow measurement sensor based on time-of-flight according to claim 4, wherein the beams are acoustic waves, ultrasonic waves, electromagnetic waves or light waves.

15. The structure of a flow measurement sensor based on time-of-flight according to claim 5, wherein the beams are acoustic waves, ultrasonic waves, electromagnetic waves or light waves.

16. A method for installing a flow measurement sensor based on time-of- flight, comprising the following steps:
vertically installing a first and a second flow measurement sensors of a flow measurement sensor pair on a pipeline wall in such a way that a beam straight line does not intersect with an axis of the pipeline and forms, with the axis of the pipeline, an included angle less than 90°;
wherein the step of vertically installing the second flow measurement sensor on the pipeline wall comprises the following steps:
calculating, according to a set second included angle, a fourth included angle on the cross section of the pipeline which is formed by an installation axis of the second flow measurement sensor and the first flow measurement sensor, wherein a formula for calculating the fourth included angle θ is θ=180°−2*β, wherein the second included angle β is an included angle between an installation axis of the first flow measurement sensor or the installation axis of the second flow measurement sensor and a projection of the beam straight line on the cross section of the pipeline;
calculating an offset distance of an installation point of the second flow measurement sensor from the first flow measurement sensor along the axis of the pipeline, wherein a formula for calculating the offset distance L is L=ID*cos(β)*sin(β)/tan(γ), wherein the third included angle γ is an included angle between an indicating direction of a first flow direction indicator and a first plane formed by the beam straight line and the installation axis of the first flow measurement sensor, and ID represents a diameter of the pipeline; and
vertically installing the second flow measurement sensor on the pipeline wall according to the calculated fourth included angle and the offset distance.

17. The method for installing a flow measurement sensor based on time-of-flight according to claim 16, wherein the step of vertically installing the second flow measurement sensor on the pipeline wall according to the calculated fourth included angle and the offset distance comprises the following steps:
determining whether beams between the first flow measurement sensor and the second flow measurement sensor are reflected by the pipeline wall or not, if so, then process to the next step; otherwise, vertically installing the second flow measurement sensor on the pipeline wall directly according to the calculated fourth included angle and the offset distance;
calculating an included angle θ' between an installation position of the first flow measurement sensor and an installation position of the second flow measurement sensor on the cross section of the pipeline, wherein a formula for calculating the included angle θ' is θ'=θ*(N+1), wherein θ is the fourth included angle, and N is the number of reflections of the beams on the inner wall of the pipeline;
calculating an installation spacing according to the offset distance, wherein a formula for calculating the installation spacing L' is L'=L*(N+1), wherein L is the offset distance, and N is the number of reflections of the beams on an inner wall of the pipeline; and
vertically installing the second flow measurement sensor on the pipeline wall according to the calculated included angle θ' and the installation spacing.

18. The method for installing a flow measurement sensor based on time-of-flight according to claim 16, further comprising the step of adjusting indicating directions of the first flow direction indicator and the second flow direction indicator to be parallel to the axis of the pipeline.

19. The method for installing a flow measurement sensor based on time-of-flight according to claim 17, further comprising the step of adjusting indicating directions of the first flow direction indicator and the second flow direction indicator to be parallel to the axis of the pipeline.

* * * * *